United States Patent
Lim

(12) United States Patent (10) Patent No.: US 6,801,508 B1
(45) Date of Patent: Oct. 5, 2004

(54) ASYNCHRONOUS TRANSFER MODE PACKET NETWORK AND METHOD FOR TRANSFERRING PACKET DATA IN THE SAME

(75) Inventor: Byung Keun Lim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/566,813

(22) Filed: May 8, 2000

(30) Foreign Application Priority Data

May 11, 1999 (KR) ........................................ 1999-16840

(51) Int. Cl.[7] .............................. H04L 12/64; H04Q 7/22
(52) U.S. Cl. .................................... 370/310.1; 370/338
(58) Field of Search ................................ 370/328, 338, 370/310.1, 401, 395.1, 310.2

(56) References Cited

U.S. PATENT DOCUMENTS

| | | | | |
|---|---|---|---|---|
| 5,886,989 | A | * | 3/1999 | Evans et al. ................. 370/347 |
| 6,418,126 | B1 | * | 7/2002 | Gilmurray et al. ........ 370/310.1 |
| 6,563,827 | B1 | * | 5/2003 | Brueckheimer et al. . 370/395.1 |
| 6,606,310 | B1 | * | 8/2003 | Vialen et al. ................ 370/338 |
| 6,608,832 | B2 | * | 8/2003 | Forslow ....................... 370/353 |
| 2003/0012133 | A1 | * | 1/2003 | Jappinen ..................... 370/225 |
| 2003/0039237 | A1 | * | 2/2003 | Forslow ....................... 370/352 |

* cited by examiner

*Primary Examiner*—Melvin Marcelo
(74) *Attorney, Agent, or Firm*—Fleshner & Kim, LLP

(57) ABSTRACT

A cellular asynchronous transfer mode packet network and a method for transferring packet data in the same is disclosed. A virtual circuit is established between a serving radio network controller and a target radio network controller, or between the serving radio network controller and a target packet data node. Also, individual packet paths are established between the serving radio network controller and the target radio network controller or between the serving radio network controller and the target packet data node through a mobile packet router. Individual data blocks of the packet data or packet sessions are multiplexed/demultiplexed over the virtual circuit on the basis of a service specific convergence sub-layer protocol. The multiplexed/demultiplexed data blocks are routed according to authenticated destination identifiers. Therefore, one virtual circuit is established between a packet network access node and a radio network controller and packet data or packet sessions from a plurality of mobile terminals are multiplexed/demultiplexed and transferred on the established virtual circuit.

26 Claims, 7 Drawing Sheets

| Control Message ID | Message | Direction R-P |
|---|---|---|
| 0x01 | MS registration | → |
| 0x02 | Location update | → |
| 0x03 | PPP Link data flow control | ↔ |
| 0x04 | Radio connection states of mobile satation & IP QoS | ↔ |
| 0x05 | Billing data information | → or ← |

ASYNCHRONOUS TRANSFER MODE PACKET NETWORK AND METHOD FOR TRANSFERRING PACKET DATA IN THE SAME

BACKGROUND OF THE INVENTION

1. Field of the Invention

The present invention relates to a packet data network and packet data transfer method, and more particularly to an asynchronous transfer mode (ATM) packet network which is suitable to a radio communication network, and a method for transferring packet data in the same.

2. Background of the Related Art

Research is now in progress for introducing ATM switches into cellular/personal communication service (PCS) mobile communication systems which are now commercially available. One proposed example is a mobile communication network utilizing an ATM switch for transferring data from a cellular mobile terminal to a receiver, which is shown in block form in FIG. 1.

In FIG. 1, user packet data sent from a mobile terminal 11 is delivered to a radio network controller (RNC) 31 through an associated base station 21. Then, the radio network controller 31 transfers the delivered user packet data to a destination radio network controller or a destination packet data node (PDN) along a path determined by a mobile switching center (MSC) 41.

In order to select and determine a data path for the mobile terminal 11, the signaling between the radio network controller 31 and mobile switching center 41 and the signaling between the mobile switching center 41 and packet data node 61 are performed through signaling ATM adaptation layers (SAALs) which are provided respectively in the radio network controller 31, mobile switching center 41 and packet data node 61, as shown in FIG. 2, in the case where an ATM switch is used. At this time, one virtual circuit is assigned to each mobile terminal call to transfer user data.

However, when the radio network controller 31 and packet data node 61 serve as nodes of the communication network using the ATM switch, outgoing data from the radio network controller or packet data node must be transferred through a virtual circuit in a circuit switched manner based on the ATM switch, as shown in FIG. 3. For this reason, the radio network controller or packet data node has to assign such a virtual circuit under the condition that the associated mobile terminal establishes a data or speech call connection. There is a limitation in establishing a virtual circuit for the ATM switch with respect to every unit physical connection port, and a signaling processing time is further required for the virtual circuit establishment.

In other words, when a source mobile terminal establishes a packet path to a destination mobile terminal or an Internet host to receive a packet data service, the associated radio network controller, ATM switch, and packet data node interact to assign a virtual circuit to the established packet path. The assigned virtual circuit is kept in an active state while user packet data is transferred. It then enters a dormant state if it is not in use for a given period of time.

Thereafter, if the virtual circuit is reused within a prescribed period of time, it again becomes active. The virtual circuit, however, is released unless it is reused within that prescribed period of time. Consequently, if a large number of mobile terminals keep their paths in the dormant state at a time or region having heavy traffic, the number of virtual circuits for the packet data service may be insufficient as compared with the number of users.

In order to prevent the above virtual circuit insufficiency, dormant virtual circuits may be released unless data is transferred for a prescribed period of time. When released, the associated mobile terminal has to reestablish the released packet data path to resume the packet transfer, resulting in an inconvenience.

As a result, the conventional mobile communication network as shown in FIG. 1 is limited in the number of virtual circuits to be assigned as the volume of traffic increases above a threshold value. This makes it difficult to efficiently execute packet data communication.

The above references are incorporated by reference herein where appropriate for appropriate teachings of additional or alternative details, features and/or technical background.

SUMMARY OF THE INVENTION

An object of the present invention is to provide an ATM network that substantially obviates at least the above problems caused by disadvantages of the related art.

Another object of the present invention is to provide an ATM packet network in which, when an ATM switch is used to transfer radio packet data from a mobile terminal, such as a cellular device, terminating at a radio network controller to a wire packet network access node or another radio network controller or vice versa, one virtual circuit is established between the packet network access node and radio network controller and a method for transferring packet data in the same.

Another object of the present invention is to provide an ATM packet network in which packet data or packet sessions from a plurality of mobile terminals are multiplexed/demultiplexed and transferred on an established virtual circuit between a packet network access node and a radio network controller, and a method for transferring packet data in the same.

To achieve at least the above objects in whole or in parts, there is provided a cellular asynchronous transfer mode packet network comprising a plurality of radio network controllers, each of the radio network controllers for performing a channel assignment function based on a service option of a source mobile station to separate packet data and circuit data service paths from each other upon interfacing with a core network; a packet call controller connected in common to the radio network controllers in its radio service area for supporting a speech communication exchange function and location registration and mobility of the source mobile station and managing location information of the source mobile station and information of packet connection nodes; a mobile packet router connected in common to the radio network controllers for routing packet data or packet sessions from the radio network controllers to established transfer paths, respectively; and a plurality of packet data nodes connected in common to the mobile packet router, each of the packet data nodes routing a corresponding one of the packet data or packet sessions routed by the mobile packet router according to a destination identifier; whereby a virtual circuit is established between a serving one of the radio network controllers and a target one of the radio network controllers or between the serving radio network controller and a target one of the packet data nodes and data blocks of the packet data or packet sessions are multiplexed/demultiplexed over the virtual circuit and transferred respectively to corresponding destinations via the mobile packet router, the packet connection nodes being the serving radio network controller and the target radio network controller or the target packet data node.

In accordance with another embodiment of the present invention, there is provided a method for transferring packet data in a cellular asynchronous transfer mode packet network which has one or more radio network controllers, a packet call controller, one or more packet data nodes and a mobile packet router, comprising the first step of establishing a virtual circuit between a serving one of the radio network controllers and a target one of the radio network controllers or between the serving radio network controller and a target one of the packet data nodes; the second step of establishing individual packet paths between the serving radio network controller and the target radio network controller or between the serving radio network controller and the target packet data node through the mobile packet router; the third step of multiplexing/demultiplexing individual data blocks of the packet data or packet sessions over the virtual circuit on the basis of a service specific convergence sub-layer protocol; and the fourth step of routing the multiplexed/demultiplexed data blocks according to authenticated destination identifiers.

In a preferred embodiment of the present invention, there is no need to assign virtual circuits respectively to packet paths for packet calls or packet sessions from individual mobile terminals. One virtual circuit is established between every radio network controller at which packet data from an associated mobile terminal terminates and another radio network controller or between every radio network controller and every packet data node. Further, a nearly unlimited number of packet paths is assigned over the established virtual circuit. That is, individual packet calls or packet sessions from the associated mobile terminals are multiplexed/demultiplexed on one virtual circuit interconnecting a serving radio network controller and a target radio network controller or interconnecting the serving radio network controller and a target packet data node. Moreover, it is not necessary to perform a signaling process to establish the respective packet paths of the mobile terminals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 10a and 10b are drawings that show formats of a control data block and point-to-point protocol data block of the payload field shown in FIGS. 8 and 9, respectively.

DETAILED DESCRIPTION OF PREFERRED EMBODIMENTS

Figure 1:
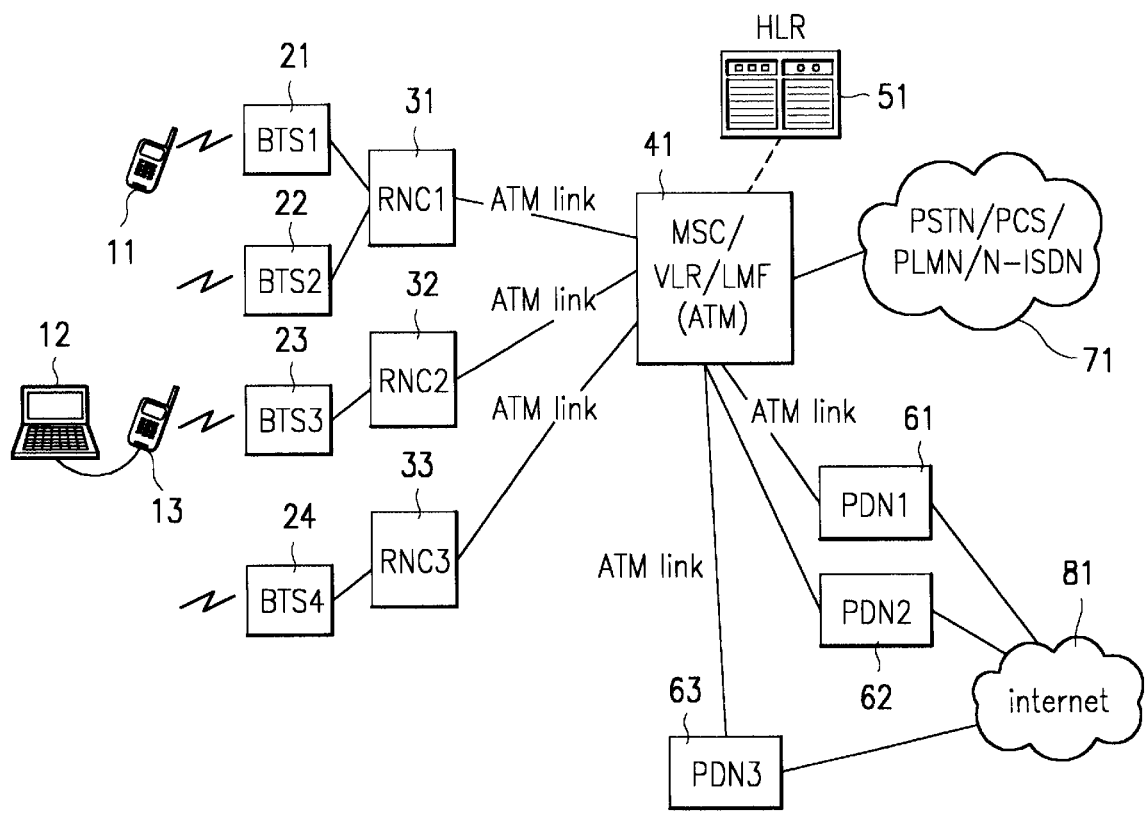
FIG. 1 is a block diagram showing a conventional mobile communication network utilizing an ATM switch.
Figure 2:
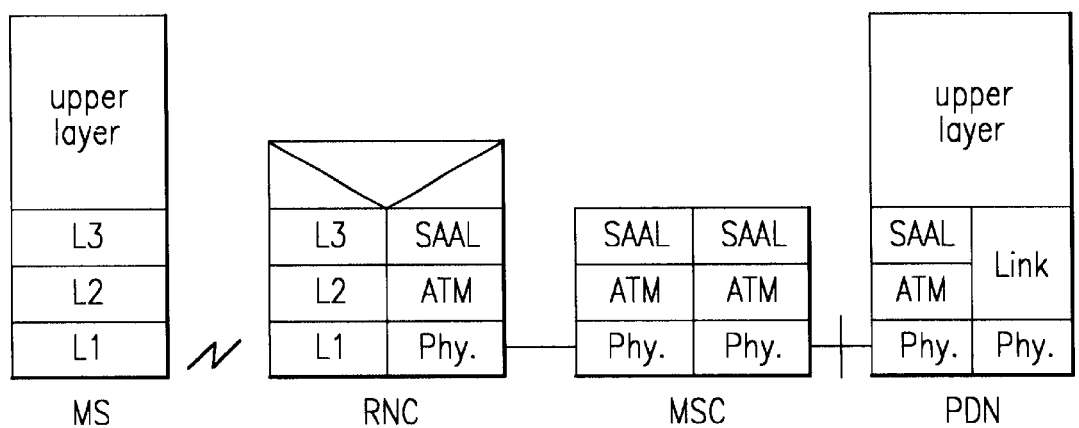
FIG. 2 is a drawing that shows an ATM signaling protocol stack for the establishment of a packet call of a mobile terminal in the network of FIG. 1.
Figure 3:
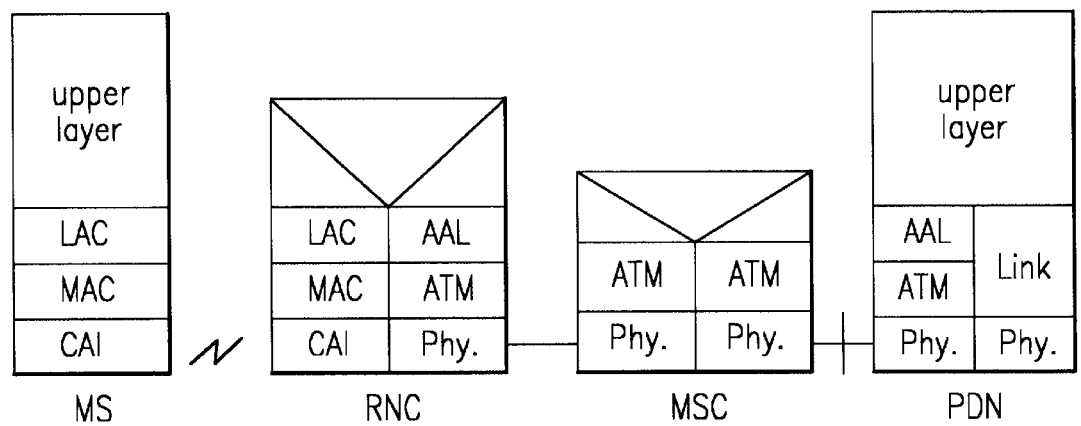
FIG. 3 is a drawing that shows a data protocol stack based on the ATM switch for the transfer of packet data from the mobile terminal in the network of FIG. 1.
Figure 4:
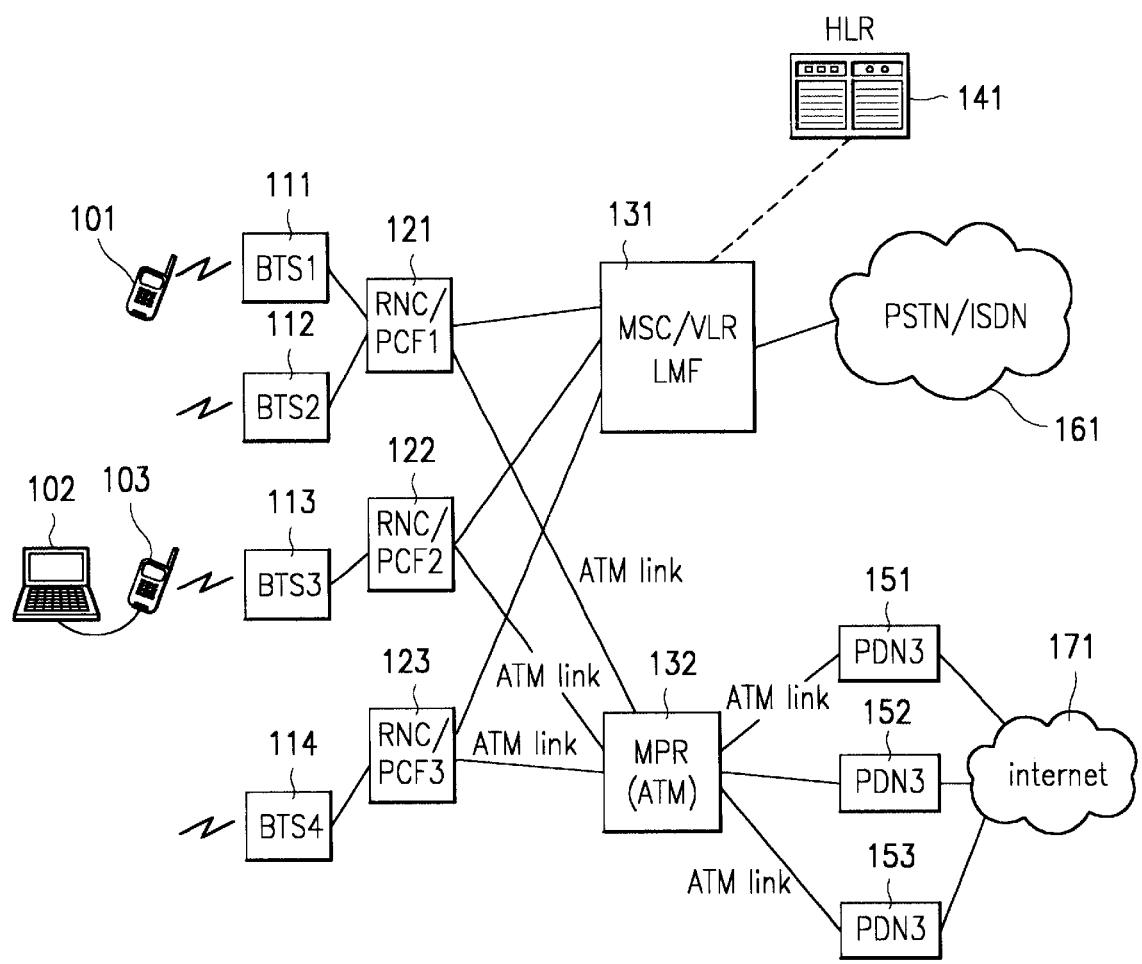
FIG. 4 is a block diagram illustrating a cellular ATM packet network in accordance with a preferred embodiment of the present invention.

FIG. 4 shows a block form of an architecture of a cellular ATM packet network in accordance with a preferred embodiment of the present invention. As shown in this drawing, the cellular ATM packet network comprises a plurality of mobile terminals 101 and 103, each of which establishes radio communication with one of a plurality of base stations 111–114. A user data terminal 102 can be connected to a specific mobile terminal, for example 103, for performing data communication therewith. Each of the base stations 111–114 is preferably connected to a specific one of the mobile terminals 101 and 103 over a radio channel.

The cellular ATM packet network further comprises a plurality of radio network controllers 121–123, each of which is connected to a specific one of the base stations 111–114. Each of the radio network controllers 121–123 is adapted to perform a channel assignment function based on a service option of an associated one of the mobile terminals 101 and 103. This function separates packet data and circuit data service paths from each other upon interfacing with a core network. A packet call controller 131 is connected in common to the radio network controllers 121–123 to support a speech communication exchange function and location registration and mobility of the mobile terminals 101 and 103. The packet call controller 131 is also adapted to manage location information of a packet serving one of the mobile terminals 101 and 103 and information of packet connection nodes (i.e., a radio network controller and packet data node).

The packet call controller 131 includes a mobile switching center (MSC) and visitor location register (VLR) for interacting to support the speech communication exchange function and the location registration and mobility of the mobile terminals 101 and 103, and a location management function (LMF) entity for managing the location information of the packet serving mobile terminal and the information of the packet connection nodes.

A home location register (HLR) 141 is preferably coupled to the packet call controller 131 for managing the mobility of the mobile terminals 101 and 103. A communication network 161 consisting of a public switched telephone network (PSTN) and integrated services digital network (ISDN) can also coupled to the packet call controller 131.

A mobile packet router 132 is connected in common to the radio network controllers 121–123 for routing outgoing packet data from a specific one of the radio network controllers 121–123 or incoming packet data received therein to an established transfer path in an ATM switching way.

Preferably, the mobile packet router 132 may be any one of an ATM switch, frame relay switch, and Internet protocol (IP) router.

The cellular ATM packet network further comprises a plurality of packet data nodes (PDNs) 151–153 connected in common to the mobile packet router 132. Each of the packet data nodes 151–153 is adapted to route outgoing packet data provided by the mobile packet router 132 or incoming packet data received therein according to a related identifier. The Internet 171 is also preferably connected in common to the packet data nodes 151–153.

In the cellular ATM packet network of the above-mentioned embodiment, one virtual circuit may be assigned to each mobile terminal's packet call or packet session to provide a packet path for packet data service. By doing so, however, a considerable amount of time is required in assigning a virtual circuit between two nodes of the mobile packet router 132 based on the ATM switching mode using the B-ISDN signaling prescribed in the Q.2931 standard publication of the International Telecommunication Union.

For example, when packet communication is required between the mobile terminal 101 belonging to the radio network controller 121 and the data terminal 102 belonging to the radio network controller 122, the inter-node virtual circuit assignment is performed between the radio network controller 121 and mobile packet router 132 and between the mobile packet router 132 and radio network controller 122, respectively. When packet communication is required between the mobile terminal 101 belonging to the radio network controller 121 and the Internet 171 through a specific one of the packet data nodes 151–153, for example, 151, the inter-node virtual circuit assignment is performed between the radio network controller 121 and mobile packet router 132 and between the mobile packet router 132 and packet data node 151, respectively.

To avoid the above problem, even if no data is transferred when a mobile station packet service is not at an active state, an associated virtual circuit may be permitted to enter a dormant state so that it can be maintained as it is. By doing so, however, a virtual circuit between a serving radio network controller and a target radio network controller or between the serving radio network controller and a target packet data node, interconnected via the mobile packet router, is liable to be lost in a poor communication environment where the volume of traffic abruptly exceeds a prescribed threshold value.

Therefore, according to a preferred embodiment of the present invention, to improve the system and reduce the above-mentioned problems, a virtual circuit is preferably established between every radio network controller and another radio network controller or between every radio network controller and every packet data node in either a permanent virtual circuit (PVC) mode or a switched virtual circuit (SVC) mode.

Further, a large number of packet paths can be assigned between a serving radio network controller and a target radio network controller, or between the serving radio network controller and a target packet data node. For example, individual packet calls or packet sessions from the associated mobile terminals can be multiplexed/demultiplexed on one virtual circuit interconnecting the serving radio network controller and target radio network controller or interconnecting the serving radio network controller and target packet data node. Consequently, a sufficient number of packet paths can be assigned to one virtual circuit.

The above described embodiment of the present invention can preferably be implemented with an ATM adaptation layer (referred to hereinafter as AAL) having a service specific convergence sub-layer (referred to hereinafter as SSCS) protocol for the multiplexing/demultiplexing of mobile station packet session data suitable to a packet service based on a cellular mobile telephone communication network.

The AAL functions to establish a virtual circuit between ATM terminal nodes or mobile terminals interconnected in a network having an ATM switch. This AAL is classified into five types, or AAL1, AAL2, AAL3, AAL4 and AAL5, according to traffic characteristics of data to be transferred. In a preferred embodiment of the present invention, a signaling AAL (SAAL) for the establishment of a virtual circuit is defined on the basis of the AAL type 5. Each AAL is composed of a common part convergence sub-layer (referred to hereinafter as CPCS) and a SSCS, which acts to readily cope with a variety of application environments. The SSCS has different functions according to application fields of a communication network having an ATM switch.

Figure 5:
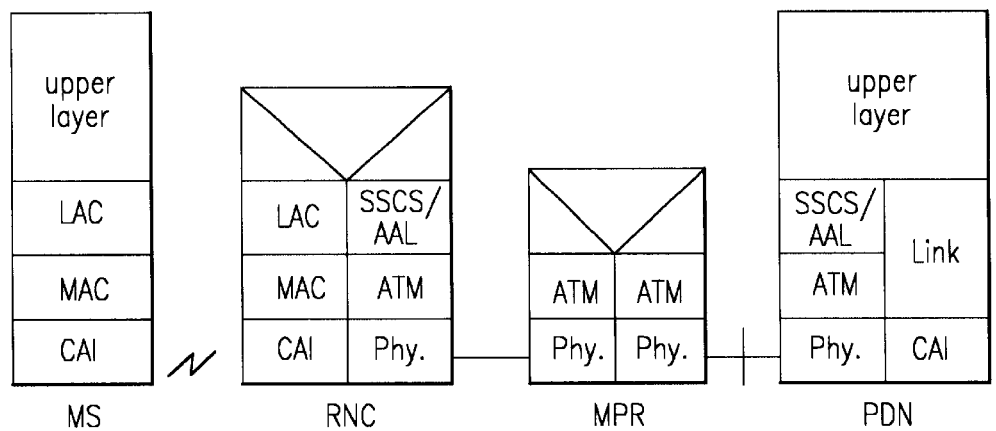
FIG. 5 is a drawing that shows a packet data communication protocol stack for the multiplexing of packet data between a mobile station and packet data node in the network of FIG. 4.
Figure 6:
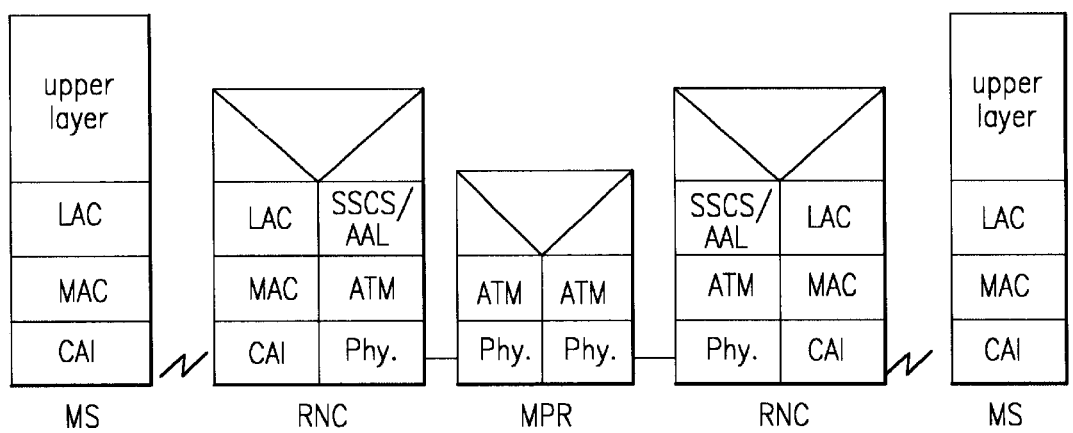
FIG. 6 is a drawing that shows a packet data communication protocol stack for the multiplexing of packet data between the mobile station and another mobile station in the network of FIG. 4.

The SSCSs are adapted to multiplex/demultiplex packet calls or packet sessions from the associated mobile terminals, respectively. In the present invention, as shown in FIGS. 5 and 6, the SSCSs are located respectively in AALs which are upper layers of ATM layers in the ATM terminals nodes, or the radio network controller and packet data node, of the cellular ATM packet network in FIG. 4. (Here, LAC refers to an L2TPAccess controller). Each of the SSCSs functions to multiplex/demultiplex all packet session data on either a virtual circuit assigned in a permanent virtual circuit (PVC) mode of the cellular ATM packet network or a virtual circuit assigned between the associated ATM terminal node and mobile packet router in an ATM switch virtual circuit (SVC) mode. Each SSCS further functions to control node modification of the associated radio network controller based on mobility of the associated mobile station, registration to the associated packet data node and a cellular packet flow.

In the preferred embodiment of the present invention, a protocol data unit (PDU) block of the CPCS (referred to hereinafter as "CPCS-PDU block") of the AAL5 is transferred over a virtual circuit established between a serving radio network controller and a target radio network controller (as shown in FIG. 6) or between the serving radio network controller and a target packet data node (as shown in FIG. 5) in the cellular ATM packet network of FIG. 4. A packet call or packet session from a specific mobile station is multiplexed/demultiplexed and transferred on such a virtual circuit.

Figure 7:
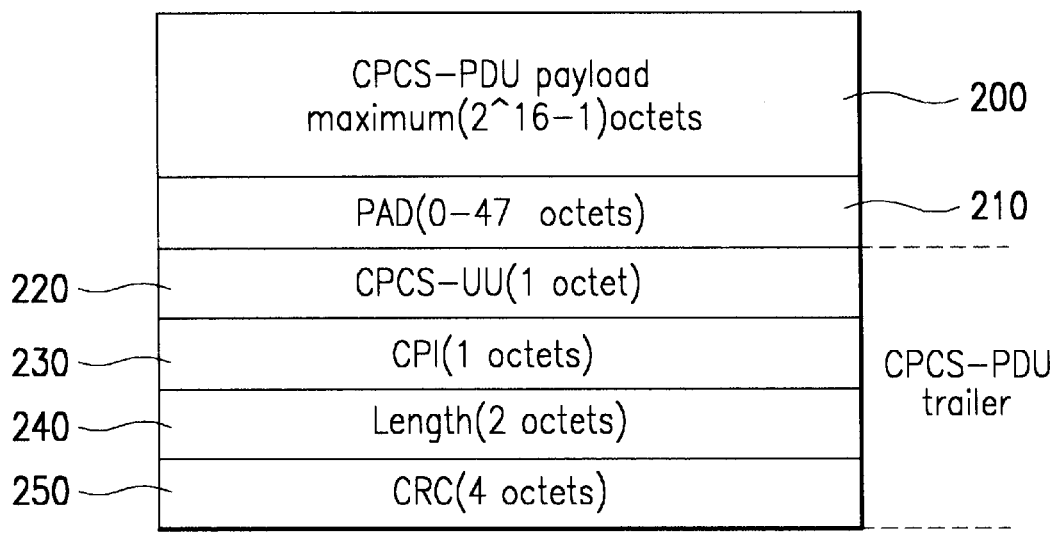
FIG. 7 is a drawing that shows a format of a protocol data unit block of a common part convergence sub-layer applied to an ATM adaptation layer shown in FIGS. 5 and 6.

FIG. 7 shows a format of the CPCS-PDU block applied to the AAL5. In the preferred embodiment of the present invention, the CPCS-PDU block includes a CPCS-PDU payload field 200 for transferring user information of up to $2^{16}-1$ bytes at the maximum, and a pad field 210 for adjusting the length of the CPCS-PDU payload field 200 to an ATM cell unit multiple of 48 bytes, such that it is applicable to an ATM segmentation and re-assembly (SAR) sub-layer, which is a lower layer of the CPCS. The CPCS-PDU block further includes a CPCS-user-to-user (CPCS-UU) indication field 220 for transparently transferring user-to-user information of the CPCS, and a common part indicator (CPI) field 230 for setting up the total number of bits of a CPCS-PDU trailer to 64. Additionally, a length field 240 indicates the length of the CPCS-PDU payload field 200, and a cyclic redundancy check (CRC) field 250 indicates a CRC value of the entire CPCS-PDU block except itself.

Figure 8:
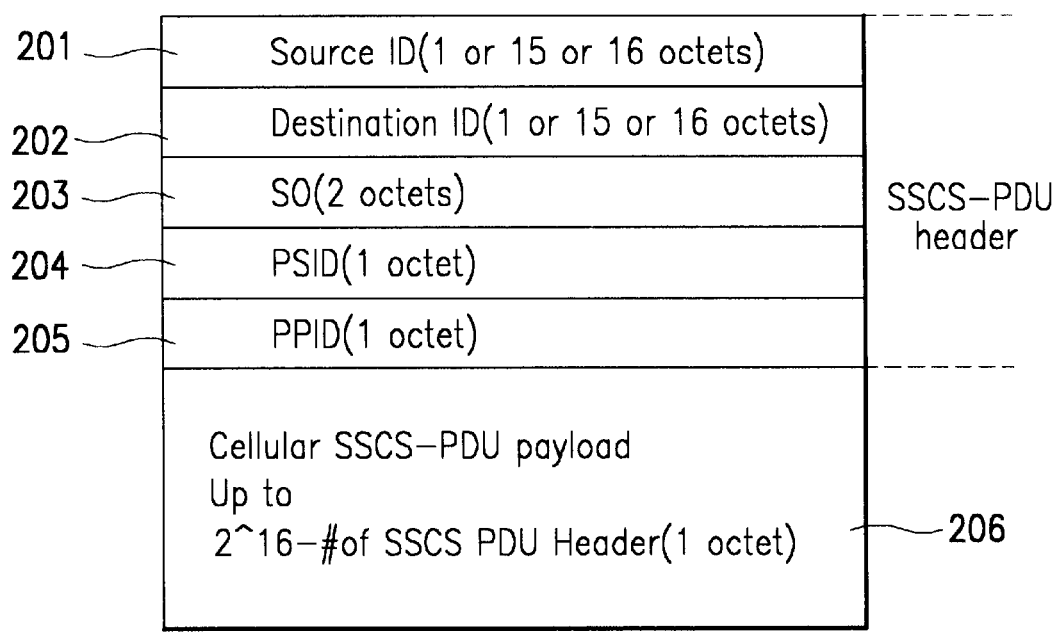
FIGS. 8 and 9 are drawings that show different formats of a payload field in a protocol data unit block of a service specific convergence sub-layer applied to the ATM adaptation layer shown in FIGS. 5 and 6.
Figure 9:
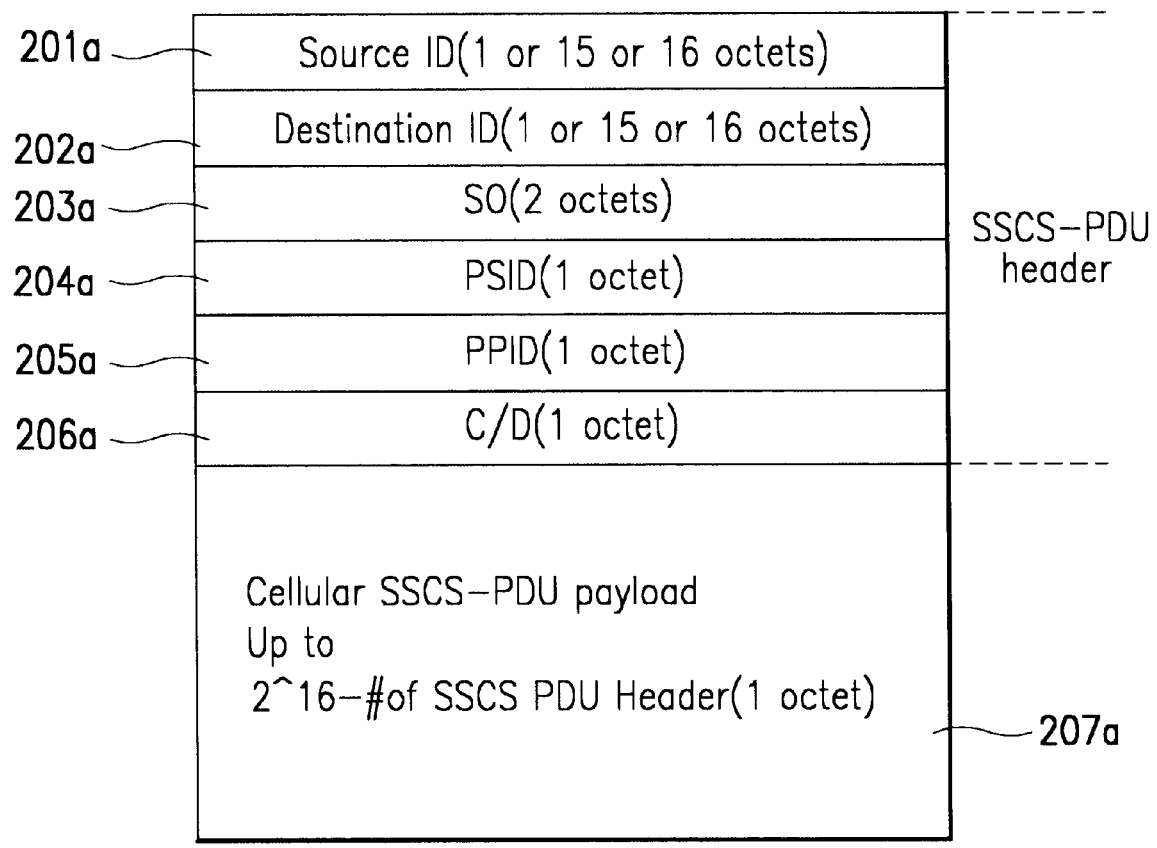

In a preferred embodiment of the present invention, the CPCS-PDU payload field 200 in FIG. 7 can be defined similarly to a payload field in a PDU block of the SSCS (referred to hereinafter as "SSCS-PDU block") as shown in FIGS. 8 and 9.

FIG. 8 shows an A type format of the SSCS-PDU payload field. As shown in this drawing, the SSCS-PDU payload field includes a source identifier (ID) field 201 for identifying a multiplexing source of a virtual circuit, and a destination ID field 202 for identifying a demultiplexing destination of the virtual circuit. It further includes a service option (SO) field 203 for indicating the service type of a packet call from a source terminal. The SO field 203 is used when the cellular packet ATM network sets up a radio terminal connection. The SSCS-PDU payload field further includes a packet session identifier (PSID) field 204 for identifying a packet session with the same service option and a unique packet session identifier, and a payload packet identifier (PPID) field 205 for identifying an upper layer protocol identifier transferred over the SSCS-PDU payload field.

Preferably, the destination ID field 202 may include any one of a terminal ID (15 octets), an ID (16 octets) of a packet data node assigned in the cellular packet ATM network, and a default ID (1 octet). This is determined according to bit values of the first octet of the destination ID field 202. Specifically, if the bit values of the first octet are 0xDD, they indicate that the destination ID field 202 includes a 1-octet default ID signifying a packet data node connected to the virtual circuit. If the bit values of the first octet are 0xDF, they indicate that the destination ID field 202 includes a 16-octet ID of a packet data node connected to the virtual circuit. If the bit values of the first octet are neither 0xDD nor 0xDF, they indicate that the destination ID field 202 includes a 15-octet ID of a destination mobile terminal belonging to a radio network controller connected to the virtual circuit.

FIG. 9 shows a B type format of the SSCS-PDU payload field, wherein an information field 206a of 1 byte is provided in addition to the A format of FIG. 8 to indicate the contents of the SSCS-PDU payload field. The information field 206a is a control/data (C/D) field which indicates whether the contents of the SSCS-PDU payload field are upper layer user data or SSCS control data. In the case of the SSCS control data, the C/D field 206a can also indicate a type of the control data.

The SSCS-PDU block of the AAL5 shown in FIGS. 8 and 9 can be defined as follows. Individual packet data from a plurality of terminals can be multiplexed/demultiplexed on one virtual circuit between a serving radio network controller and a target radio network controller or between the serving radio network controller and a target packet data node on the basis of the source ID field 201 or 201a and destination ID field 202 or 202a. Further, the multiplexing/demultiplexing operations can be performed according to a service option in the SO field 203 or 203a and a packet session identifier in the PSID field 204 or 204a. A receiver can effectively recognize an upper layer protocol transferred over the payload field on the basis of the PPID field 205 or 205a. Also, the receiver can readily recognize on the basis of information from the C/D field 206a whether payload data is user data or SSCS control data.

The operation of the cellular packet ATM network with the architecture as shown in FIG. 4 will next be described with respect to the following three scenarios. First, where a source mobile station belonging to a serving radio network controller sends packet data with a specific service option and a packet session identifier to a destination mobile station. Second, where a source mobile station belonging to a serving radio network controller designates an identifier of a target packet data node and sends packet data with a specific service option and a packet session identifier to the target packet data node. Third, where a source mobile station belonging to a serving radio network controller requests an Internet/packet network connection data service with a specific service option and a packet session identifier and receives data as a result of the request.

In the first scenario, a source mobile station belonging to a serving radio network controller sends packet data with a specific service option and a packet session identifier to a destination mobile station. In this case, the serving radio network controller RNC or packet controller PCF receives from the packet call controller a node identifier of a target radio network controller where a destination mobile station is located and authenticate an identifier of a virtual circuit with the target radio network controller. A sending SSCS of AAL5 stores the service option, the packet session identifier, a destination mobile station identifier and the virtual circuit identifier and creates a SSCS-PDU header on the basis of the stored service option and identifiers. Then, the sending SSCS places user packet data or SSCS control data on a SSCS-PDU payload field and transfers the resultant data block to a CPCS of the AAL5. As a result, the multiplexing and sending procedures are completed. The SSCS-PDU block is sent to the target radio network controller over the virtual circuit and via the mobile packet router MPR and demultiplexed by a receiving SSCS. Consequently, the destination mobile station identifier is authenticated for the transfer of received data to the destination mobile station or an operation associated with the SSCS control data is performed.

In the second scenario, a source mobile station belonging to a serving radio network controller designates an identifier of a target packet data node and sends packet data with a specific service option and a packet session identifier to the target packet data node. In this case, the serving radio network controller RNC or packet controller PCF authenticates an identifier of a virtual circuit with the target packet data node on the basis of the identifier of the target packet data node. A sending SSCS of AAL5 stores a destination mobile station identifier, the service option, the packet session identifier, the target packet data node identifier and the virtual circuit identifier and creates a SSCS-PDU header on the basis of the stored service option and identifiers. Then, the sending SSCS places user packet data or SSCS control data on a SSCS-PDU payload field and transfers the resultant data block to a CPCS of the AAL5, resulting in the multiplexing and sending procedures being completed. As a result, the SSCS-PDU block is sent to the target packet data node over the virtual circuit and via the mobile packet router MPR and demultiplexed by a receiving SSCS. Consequently, the destination mobile station identifier is authenticated for the transfer of received data to a destination mobile station or an operation associated with the SSCS control data is performed.

It should be noted that packet data from a specific packet data node can be transferred to only a mobile terminal pre-registered to the packet data node. The multiplexing operation is performed on the basis of a packet destination virtual circuit identifier from a table mapping a packet destination address to the mobile terminal and information of a SSCS-PDU header of a SSCS in the packet data node. Upon receiving a multiplexed SSCS-PDU block, a sending AAL5 CPCS sends the received SSCS-PDU block to a target AAL5 CPCS. As a result, the sent SSCS-PDU block is demultiplexed by a receiving SSCS and the resultant packet data is transferred to the mobile terminal.

In the third scenario, a source mobile station belonging to a serving radio network controller requests an Internet/packet network connection data service with a specific service option and a packet session identifier and receives data as a result of the request. In this case, the serving radio network controller RNC or packet controller PCF determines on the basis of the service option and packet session identifier whether the source mobile station were pre-registered thereto. If the source mobile station has been pre-registered, the serving radio network controller RNC or packet controller PCF transfers received user packet data and an identifier of a virtual circuit with a preconnected target packet data node to a sending SSCS, which then multiplexes and transfers a SSCS-PDU block to an AAL5 CPCS. If the source mobile station has not been pre-registered, the serving radio network controller RNC or packet controller PCF regards the source mobile station as a new one to be registered and thus receives an identifier of a target packet data node to be routed, from the packet call controller.

Then, the serving radio network controller RNC or packet controller PCF authenticates an identifier of a virtual circuit with the routed target packet data node on the basis of the identifier of the routed target packet data node. The sending SSCS of AAL5 stores the service option, packet session identifier and virtual circuit identifier, and creates a SSCS-PDU header on the basis of the stored service option and identifiers. The sending SSCS then places user packet data or SSCS control data on a SSCS-PDU payload field and transfers the resultant data block to a CPCS of the AAL5, resulting in the multiplexing and sending procedures being completed.

As a result, the SSCS-PDU block is sent to the routed target packet data node over the virtual circuit and via the mobile packet router MPR and demultiplexed by a receiving SSCS. A source mobile station identifier is consequently authenticated for the transfer of received data to the source mobile station or an operation associated with the SSCS control data is performed.

It should be noted that packet data from a specific packet data node can be transferred to only a mobile terminal pre-registered to the packet data node. The multiplexing operation is performed on the basis of a packet destination virtual circuit identifier from a table mapping a packet destination address to the mobile terminal and information of a SSCS-PDU header of a SSCS in the packet data node. Upon receiving a multiplexed SSCS-PDU block, a sending AAL5 CPCS sends the received SSCS-PDU block to a target AAL5 CPCS. As a result, the sent SSCS-PDU block is demultiplexed by a receiving SSCS and the resultant packet data is transferred to the mobile terminal.

In the three scenarios described above, the virtual circuit between the serving radio network controller and target radio network controller or between the serving radio network controller and target packet data node can be established in a permanent virtual circuit (PVC) mode to transfer user packet data. In such a case, the serving radio network controller RNC or packet controller PCF establishes the virtual circuit to all target radio network controllers and packet data nodes. To this end, the serving radio network controller RNC or packet controller PCF manages a node identifier of the target radio network controller or target packet data node connected to the virtual circuit in its virtual circuit table.

On the other hand, where the virtual circuit is established in a switched virtual circuit (SVC) mode, the serving radio network controller RNC or packet controller PCF establishes the virtual circuit according to signaling based on the ATM switch only when user packet data is required to be transferred to the target radio network controller or target packet data node. It preferably releases the virtual circuit when no data is transferred to the target node. The virtual circuit is not established on the basis of an individual user packet data unit.

In other words, a virtual circuit identifier associated with an identifier of a desired target node is first retrieved from a virtual circuit table and, only when it is not present in the virtual circuit table, a new virtual circuit is established and registered to the virtual circuit table. Therefore, packet data from a subsequent different terminal can be multiplexed through a pre-established virtual circuit. Further, in the case where no data is transferred between both nodes interconnected by a virtual circuit within a prescribed period of time, the virtual circuit is preferably released.

In the third scenario above, a mobile packet terminal may be connected to the Internet through a packet data node to which the terminal is connected and a point-to-point protocol (referred to hereinafter as PPP) link. In this case, a PPID field of a SSCS-PDU header contains an identifier for identifying the PPP link. A SSCS of a radio network controller to which the terminal belongs and a SSCS of a packet data node to which the PPP link of the terminal is connected send and receive control information to maintain the PPP link and continuously provide a packet data service.

Accordingly, if a mobile station has an Internet connection through the associated packet data node, this packet data node assigns an Internet protocol (IP) address in its Internet sub-network identifier as a home IP address of the mobile station or as a care of address (COA) for a mobile Internet protocol service. When the mobile station performs a hand-off or roaming operation under the condition that an Internet packet service is active, it may be registered to a new packet data node. In this case, the mobile station has to receive a new home IP address or COA from the new packet data node. As a result, such registration to a new packet data node may be subjected to a service discontinuity due to a time interval required in re-establishing the PPP link and registering the mobile IP.

Hence, so long as the Internet packet service remains active, even though the mobile station moves to an area covered by a different radio network controller, it can continuously maintain a virtual circuit with an initially registered packet data node and thus use an existing home IP address, thereby providing a packet data service with no discontinuity. To this end, a SSCS of the radio network controller and a SSCS of the packet data node should interact to hold control signals for updating a routing path of the mobile station and perform a packet data node registration control function and a cellular packet flow control function.

Figures 10, 11:
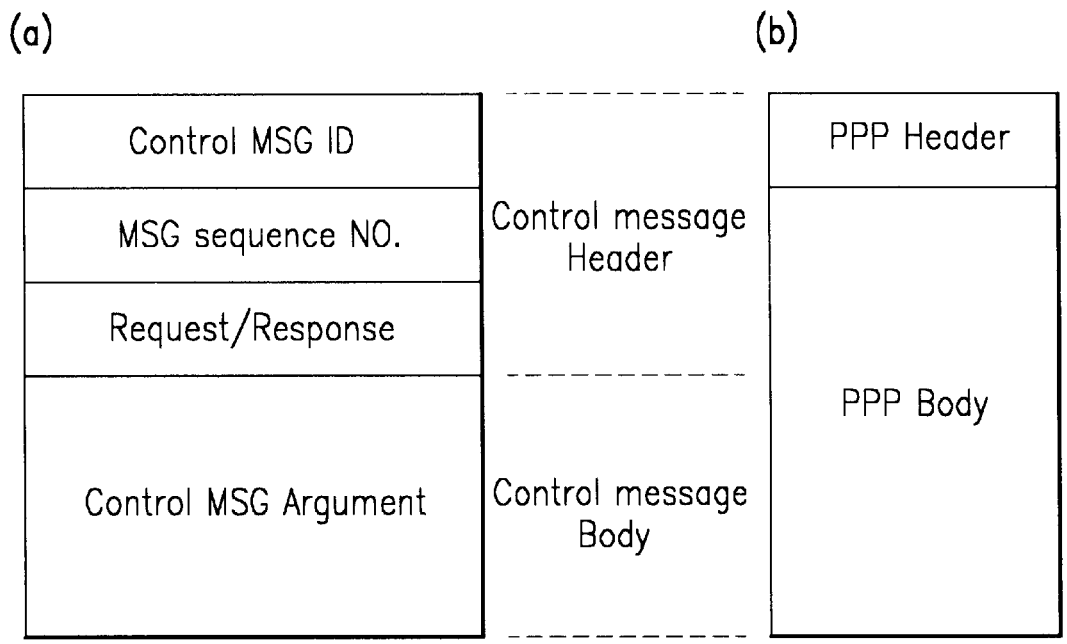
FIG. 11 is a drawing that shows types and request directions of a control message in FIG. 11.

FIG. 10 shows formats of a control data block and PPP data block of a SSCS-PDU payload field, respectively.

With reference to FIG. 10, the control data block is composed of a control message header including a control message identifier field for identifying the contents of a control message, a message sequence number field for indicating a sequence of the control message and a request/response field for identifying a request and response of the control message, and a control message text including parameters based on a unique control message identifier.

The PPP data block is composed of one PPP frame, as shown in FIG. 10.

As shown in FIG. 11, the SSCS control message may be any one of a mobile station (MS) registration message, location update message, PPP link data flow control message, mobile station radio connection state/IP quality of service (QoS) message and billing data information message.

The mobile station registration message may be used where a source mobile station is powered on and initially requests an access to the Internet, where the source mobile station requests an access to the Internet under the condition that it has been registered to a target packet data node to which a serving radio network controller cannot establish a virtual circuit connection, and where the source mobile station should be registered to a new packet data node. In these cases, a SSCS of the serving radio network controller first sends a registration request control data block to a SSCS of the target packet data node and then receives a response therefrom. At this time, the registration request control data block includes a mobile station radio QoS parameter, inter-SSCS flow control option parameter, etc.

Upon receiving the response from the target packet data node, the serving radio network controller sends user PPP link data to the target packet data node over the associated SSCS-PDU payload field. Also, upon receiving the mobile station registration message from the serving radio network controller, the target packet data node sends an acknowledge signal to the serving radio network controller and starts to transfer PPP data for LCP setup with the source mobile station over the associated SSCS-PDU payload field.

The location update message is a control message used when a source mobile station moves from an area covered by a previous radio network controller, or old RNC, to an area covered by a new radio network controller, or new RNC. The new RNC detects an identifier of a packet data node to which the source mobile station was pre-registered, from a packet call controller LMF managing a PPP link mobility binding table of a packet data terminal and transfers the location update message to the packet data node over a virtual circuit therewith.

When the source mobile station is dormant, the location update message nullifies a service option and packet session identifier in the associated SSCS-PDU header. The packet data node obtains location information of the source mobile station based on the new RNC from a received virtual circuit identifier.

The PPP link data flow control message signifies "congestion ON" when a packet buffer in a serving radio network controller exceeds a threshold value. Upon receiving a message signifying "congestion ON" from the serving radio network controller, a target packet data node sends no data thereto until it again receives a message signifying "congestion OFF" therefrom.

The mobile station radio connection state/IP QoS message is sent from a serving radio network controller to a target packet data node when there is a need to send a service option and packet session identifier due to a change from a dormant state to an active state or when radio service quality is changed. Further, the target packet data node sends the mobile station radio connection state/IP QoS message to the serving radio network controller when there is a necessity for notifying it of an IP service quality.

The billing data information message is sent from a serving radio network controller to a target packet data node or vice versa when each other's request is received or there is an event to transfer the billing data of a terminal. At this time, the control message text contains billing data information.

As is apparent from the above description, according to the preferred embodiment of the present invention, in a cellular packet ATM network which transfers packet data from a mobile terminal using an ATM switch, one virtual circuit is established between every radio network controller at which the packet data from the mobile terminal terminates and another radio network controller or between every radio network controller and every packet data node. Further, a large number of packet paths can be assigned between a serving radio network controller and a target radio network controller or between the serving radio network controller and a target packet data node. That is, individual packet calls or packet sessions from the associated mobile terminals can be multiplexed/demultiplexed on one virtual circuit interconnecting the serving radio network controller and target radio network controller or interconnecting the serving radio network controller and target packet data node. Therefore, a sufficient number of packet paths can be assigned to one virtual circuit. Moreover, it is not necessary to perform a signaling process to establish the respective packet paths of the mobile terminals.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An asynchronous transfer mode (ATM) network, comprising:

a plurality of radio network controllers, each of said plurality of radio network controllers for performing a channel assignment function based on a service option of a source mobile station to separate packet data and circuit data service paths from each other upon interfacing with a core network;

a mobile packet router coupled in common to each of said radio network controllers for routing packet data or packet sessions from said radio network controllers to established transfer paths, respectively; and a plurality of packet data nodes coupled in common to said mobile packet router, each of said packet data nodes routing a corresponding one of said packet data or packet sessions routed by said mobile packet router according to a destination identifier, wherein a virtual circuit is established between one of 1) a serving one of said radio network controllers and a target one of said radio network controllers and 2) the serving radio network controller and a target one of said packet data nodes, and wherein data blocks of said packet data or packet sessions are multiplexed/demultiplexed over said virtual circuit and transferred respectively to prescribed destinations via said mobile packet router, said serving radio network controller and one of a) said target radio network controller and b) said target packet data node being packet connection modes, wherein each of said data blocks comprises a header which includes:

a source identifier field, to identify a multiplexing source of said virtual circuit;

a destination identifier field, to identify a demultiplexing destination of said virtual circuit;

a service option field, to indicate a service type of a packet call from said source mobile station, said serving option field being used when said cellular asynchronous transfer mode packet network sets up a radio terminal connection;

a packet session identifier field, to identify a packet session with the same service option and a unique packet session identifier; and a payload packet identifier field, to identify a received upper layer protocol identifier.

2. The network of claim 1, further comprising a packet call controller coupled in common to each of said radio network controllers in its radio service area for supporting a speech communication exchange function and location registration and mobility of said source mobile station and managing location information of said source mobile station and information of the packet connection nodes.

3. The network of claim 1, wherein said mobile packet router comprises one of an asynchronous transfer mode switch, a frame relay switch, and an Internet protocol router.

4. The network of claim 1, wherein said mobile packet router is communicatively coupled to the Internet.

5. The network of claim 2, wherein said packet call controller comprises:

a mobile switching center and a visitor location register, which interact to support said speech communication exchange function and said location registration and mobility of said source mobile station; and a location management function unit which manages said location information of said source mobile station and said information of said packet connection nodes.

6. The network of claim 1, wherein the virtual circuit is one of a permanent virtual circuit and a switched virtual circuit.

7. An asynchronous transfer mode (ATM) network comprising:

a plurality of radio network controllers, each of said plurality of radio network controllers for performing a channel assignment function based on a service option of a source mobile station to separate packet data and circuit data service paths from each other upon interfacing with a core network;

a mobile packet router coupled in common to each of said radio network controllers for routing packet data or packet sessions from said radio network controllers to established transfer paths, respectively; and a plurality of packet data nodes coupled in common to said mobile packet router, each of said packet data nodes routing a corresponding one of said packet data or packet sessions routed by said mobile packet router according to a destination identifier, wherein a virtual circuit is established between one of 1) a serving one of said radio network controllers and a target one of said radio network controllers and 2) the serving radio network controller and a target one of said packet data nodes, and wherein data blocks of said packet data or packet sessions are multiplexed/demultiplexed over said virtual circuit and transferred respectively to prescribed destinations via said mobile packet router, said serving radio network controller and one of a) said target radio network controller and b) said target packet data node being packet connection modes, wherein said multiplexing/demultiplexing operations are performed on the basis of a protocol provided between 1) one of a) service specific convergence sub-layers of asynchronous transfer mode adaptation layers in said serving and target radio network controllers and b) said service specific convergence sub-layer of said asynchronous transfer mode adaptation layer in said serving radio network controller, and 2) a service specific convergence sub-layer of an asynchronous transfer mode adaptation layer in said target packet data node.

8. The network of claim 7, wherein said protocol includes a function of controlling node modification of said serving or target radio network controller based on said mobility of said source mobile station, a function of controlling registration to said target packet data node, and a function of controlling a cellular packet flow.

9. The network of claim 7, wherein said asynchronous transfer mode adaptation layer is a fifth-type asynchronous transfer mode adaptation layer, and includes said service specific convergence sub-layer, a common part convergence sub-layer and an asynchronous transfer mode segmentation and re-assembly sub-layer.

10. The network of claim 9, wherein said common part convergence sub-layer is adapted to transfer said data blocks on the basis of a protocol data unit, wherein said protocol data unit comprises:

a payload field, which contain user information;

a pad field, which adjusts a length of said payload field in such a manner that it conforms to an asynchronous transfer mode switch environment; and a user-to-user indication field, which transparently transfers user-to-user information of said common part convergence sub-layer.

11. The network of claim 10, wherein said payload field comprises:

a source identifier field to identify a multiplexing source of said virtual circuit;

a destination identifier field to identify a demultiplexing destination of said virtual circuit;

a service option field to indicate a service type of a packet call from said source mobile station, said serving option field being used when the network establishes a radio terminal connection;

a packet session identifier field to identify a packet session with the same service option and a unique packet session identifier; and a payload packet identifier field to identify a received upper layer protocol identifier.

12. The network of claim 11, wherein each of said source and destination identifier fields includes any one of an identifier of said source mobile station, an identifier of said destination mobile station, an identifier of said target packet data node, and a default identifier.

13. The network of claim 11, wherein said payload field further comprises a control/data field to indicate whether said payload field contains user data or a control data block from said service specific convergence sub-layer.

14. The network of claim 13, wherein said control data block comprises:

a control message header comprising a control message identifier field to identify the contents of a control message, a message sequence number field to indicate a sequence of said control message, and a request/response field to identify a request and response of said control message; and a control message text having parameters based on a unique control message identifier.

15. The network of claim 14, wherein said control message comprises registration information of said source mobile station, location update information of said source mobile station, point-to-point protocol link data flow control information, radio connection state information of said source mobile station, Internet protocol service quality information, and billing data information.

16. A method of transferring packet data or packet sessions in an asynchronous transfer mode packet network which has one or more radio network controllers, a packet call controller, one or more packet data nodes, and a mobile packet router, comprising the steps of:
   a) establishing a virtual circuit between a serving radio network controller and one of a target radio network controller and a target packet data node;
   b) establishing individual packet paths between the serving radio network controller and one of the target radio network controller and the target packet data node through the mobile packet router;
   c) multiplexing/demultiplexing individual data blocks of the packet data or packet sessions over said virtual circuit; and
   d) routing the multiplexed/demultiplexed data blocks according to authenticated destination identifiers, wherein said step a) comprises the further step of
   a-1) establishing said virtual circuit in one of a permanent virtual circuit mode and a switched virtual circuit mode based on an asynchronous transfer mode switching manner, wherein said step a-1) comprises the further step of
   a-2) establishing said virtual circuit in the switched virtual circuit mode based on the asynchronous transfer mode switching manner, allowing the serving radio network controller to establish said virtual circuit according to asynchronous transfer mode signaling only when the packet data has to be transferred to the target radio network controller or packet data node, and not to establish said virtual circuit when the packet data need not be transferred, and wherein said step a-2) comprises the further step of
   a-3) when the packet data has to be transferred to the target radio network controller or packet data node, allowing the serving radio network controller to retrieve a virtual circuit identifier associated with an identifier of the target radio network controller or packet data node from a virtual circuit table and establish said virtual circuit only when the virtual circuit identifier is not present in the virtual circuit table.

17. The method of claim 16, wherein said step a-1) comprises the further step of a-2) establishing said virtual circuit in the permanent virtual circuit mode based on the asynchronous transfer mode switching protocol, allowing the serving radio network controller to establish said virtual circuit to all of the radio network controllers and packet data nodes and manage a node identifier of said target radio network controller or packet data node connected to said virtual circuit in a virtual circuit table.

18. The method of claim 16, wherein the multiplexing/demultiplexing of step c) is performed in a service specific convergence sub-layer of an AAL protocol layer.

19. A method of transferring packet data or packet sessions in an asynchronous transfer mode packet network which has one or more radio network controllers, a packet call controller, one or more packet data nodes, and a mobile packet router, comprising the steps of:
   a) establishing a virtual circuit between a serving radio network controller and one of a target radio network controller and a target packet data node;
   b) establishing individual packet paths between the serving radio network controller and one of the target radio network controller and the target packet data node through the mobile packet router;
   c) multiplexing/demultiplexing individual data blocks of the packet data or packet sessions over said virtual circuit;
   d) routing the multiplexed/demultiplexed data blocks according to authenticated destination identifiers; and
   e) allowing a source mobile station belonging to the serving radio network controller to send the packet data with a specific service option and a packet session identifier to a destination mobile station, and allowing a service specific convergence sub-layer of an asynchronous transfer mode adaptation layer in said serving radio network controller to store the service option, the packet session identifier, a destination mobile station identifier, and a virtual circuit identifier, create a header of a protocol data unit on the basis of the stored service option and identifiers, place user packet data or self-control data on a payload field of the protocol data unit and send the resultant protocol data unit as the packet data to the destination mobile station.

20. A method of transferring packet data or packet sessions in an asynchronous transfer mode packet network which has one or more radio network controllers, a packet call controller, one or more packet data nodes, and a mobile packet router, comprising the steps of:
   a) establishing a virtual circuit between a serving radio network controller and one of a target radio network controller and a target packet data node;
   b) establishing individual packet paths between the serving radio network controller and one of the target radio network controller and the target packet data node through the mobile packet router;
   c) multiplexing/demultiplexing individual data blocks of the packet data or packet sessions over said virtual circuit;
   d) routing the multiplexed/demultiplexed data blocks according to authenticated destination identifiers; and
   e) allowing a mobile station belonging to the serving radio network controller to request an Internet/packet network connection data service with a specific service option and a packet session identifier and receive data as a result of the request.

21. The method of claim 20, wherein said step e) comprises the further steps of:
   e-1) allowing the serving radio network controller to determine on the basis of the specific service option and packet session identifier whether said source mobile station were pre-registered thereto;
   e-2) if it is determined at said step e-1) that the source mobile station were preregistered to the serving radio network controller, allowing the serving radio network controller to transfer the packet data and an identifier of the virtual circuit connected to the target packet data node to a service specific convergence sub-layer of an asynchronous transfer mode adaptation layer therein to multiplex and send the packet data and, if it is determined at said step e-1) that said source mobile station were not pre-registered to the serving radio network controller, allowing the serving radio network controller to receive an identifier of the target packet data node to be routed, from the packet call controller and authenticate an identifier of the virtual circuit with the target packet data node on the basis of said identifier of the target packet data node; and e-3) allowing the service specific convergence sub-layer to store the service option, packet session identifier, and virtual circuit identifier, create a header of a protocol data unit on the basis of the stored service option and identifiers, place user packet data or self-control data on a payload field of said protocol data unit, and send the resultant protocol data unit as the packet data.

22. A method for transferring packet data or packet session in a cellular asynchronous transfer mode packet network which has a plurality of radio network controllers, a packet call controller, a plurality of packet data nodes and a mobile packet router, comprising the steps of:

a) allowing a source mobile station belonging to a serving one of said radio network controllers to designate an identifier of a target one of said packet data nodes and send said packet data with a specific service option and a packet session identifier to said target packet data node;

b) allowing said serving radio network controller to authenticate an identifier of a virtual circuit with said target packet data node on the basis of said identifier of said target packet data node;

c) allowing a service specific convergence sub-layer of an asynchronous transfer mode adaptation layer in said serving radio network controller to store one or more destination mobile station identifiers, said service option, said packet session identifier, said target packet data node identifier and said virtual circuit identifier, create a header of a protocol data unit on the basis of the stored service option and identifiers and place user packet data or self-control data on a payload field of said protocol data unit to send the resultant protocol data unit as said packet data;

d) multiplexing one or more data blocks of said packet data over said virtual channel and sending the multiplexed data blocks to an asynchronous transfer mode adaptation layer in said target packet data node via said mobile packet router; and e) allowing a service specific convergence sub-layer of said asynchronous transfer mode adaptation layer in said target packet data node to demultiplex the sent data blocks, authenticate said destination mobile identifiers and transfer said packet data respectively to one or more destination mobile stations.

23. An asynchronous transfer mode (ATM) network, comprising:

at least one radio network controller for communicating with a mobile terminal;

a packet call controller for receiving voice communication from the at least one radio network controller;

a mobile packet router for receiving data communication from the at least one radio network controller; and at least one packet data node coupled to the mobile packet router, wherein the packet call controller is adapted to communicate with a Public Switched Telephone Network or an Integrated Services Digital Network, and wherein the at least one packet data node is adapted to communicate with a computer network, and wherein said data communication includes data blocks, each including a header having:

a source identifier field, to identify a multiplexing source of a virtual circuit established between the radio network controller and another radio network controller, or between the radio network controller and the packet data node;

a destination identifier field, to identify a demultiplexing destination of said virtual circuit;

a service option field to indicate a service type of a packet call from a source mobile station;

a packet session identifier field, to identify a packet session with a same service option and a unique packet session identifier; and a payload packet identifier field, to identify a received upper layer protocol identifier.

24. The network of claim 23, further comprising a home location register, wherein the packet call controller comprises a mobile switching center, visitor location register, and a location management function unit, and wherein the home location register manages the mobility of mobile terminals, and wherein the location management function unit manages the location information of the mobile terminals and the information of the radio network controllers.

25. The network of claim 23, wherein a virtual circuit is established between the at least one radio network controller and one of a receiving radio network controller and the at least one packet data node, and wherein the virtual circuit is established through one of the packet call controller and the mobile packet router.

26. The network of claim 25, wherein the virtual circuit is one of a switched virtual circuit and a permanent virtual circuit.

* * * * *